United States Patent Office 2,904,414
Patented Sept. 15, 1959

2,904,414

FORMULATION FOR PRODUCING A PROTECTIVE BRIGHT CHEMICALLY POLISHED SURFACE ON ZINC AND CADMIUM

Charles W. Ostrander and Nicholas Congiundi, Baltimore, Md., assignors to Allied Research Products, Inc., Baltimore, Md., a corporation of Maryland No Drawing. Application August 4, 1954
Serial No. 447,913

15 Claims. (Cl. 41—42)

This invention relates to the treatment of metal surfaces containing zinc and cadmium including appreciable amounts thereof and is useful both in connection with the castings and coatings of these metals.

The present application is a continuation-in-part of application Serial No. 301,598, filed July 29, 1952, now abandoned.

The principal object of the invention is to impart a chemically polished bright, colorless, water-repellent surface or film having improved corrosion resistance to zinc and cadmium and their alloys, by subjecting the metal surface to a single immersion treatment in an aqueous acidic solution containing chromic acid and/or water soluble salts thereof, such as sodium or potassium bichromate, sulfuric acid and/or water soluble salts thereof, such as sodium or ammonium sulfate, boric acid and/or water soluble salts thereof, such as sodium or potassium metaborate, and nitric acid.

Another object of the invention is to provide such a treating solution and method as will enable the above mentioned results to be uniformly obtained on a commercial scale.

A further object of the invention is to provide such a treating solution and method as will render the metal surface suitable for the reception of paint. That is, whereas the untreated metal surfaces will not afford adequate paint adhesion for commercial surfaces, metal surfaces treated according to the present invention exhibit marked paint adherence.

A more specific object of the invention is to provide a composition for use in aqueous solution to impart a protective, bright coating to zinc and cadmium articles comprising chromic acid, sodium sulfate, boric acid, and nitric acid, said chromic acid in amount from about 20 to 160 g./l., the boric acid in amount from about 10 to 40 g./l., the sodium sulfate in ratio by weight to the chromic acid in amount of about 1:6.5, the foregoing weight ranges being per liter of aqueous solution, and the nitric acid in amount to give a pH not greater than about 1.0 when the said composition is put in aqueous solution.

The use of solutions containing chromic acid and/or water soluble salts thereof and sulfuric acid and/or a water soluble salt thereof such as sodium sulfate, to impart corrosion resistance, causes discoloration. We have found that a clear, bright finish can be obtained by including boric acid and/or a water soluble salt thereof, and nitric acid, in such solution. The nitric acid is used to adjust the pH to a satisfactory working point and to act as a cheap means of maintaining this desired acidity as long as other constituents are in proper concentration. The boric acid acts as a buffer in solution and increases the solubility of the film during the transfer time between the immersion and the following rinse so that a bright finish is the result.

Treatments of the character described have certain practical aspects. For example, we obtain economy in the use of the chemicals making up the solution and speed and facility with which the desired results may be obtained. With the present invention, a single dip in the solution is sufficient to produce the improved colorless film thus facilitating commercial operations. A further advantage is that a low ratio of chromic compound to sulfate has been found operable.

Many times, the dry constituents of the dipping composition can be made up for sale as a powdered mixture. This mixture may then be dissolved in water and prepared for use. Upon the dissolution of the powdered mixture, final acidity can be adjusted by the addition of concentrated nitric acid by the consumer. As can be appreciated, this affords a substantial saving in shipping space since the powdered mixture takes up much less space than an actual working solution would. Further, it eliminates the return of carboys and shipping containers. It should also be appreciated that the dry constituents can be combined with sufficient nitric acid to give the desirable acidity and then shipped to the consumer wherein this concentrated composition can be added to water of stipulated amounts necessary to give a working aqueous dipping solution.

Optimum results are obtained with the following formulation per liter of solution.

*Example 1*

| | G./1 |
|---|---|
| Chromic acid ($CrO_3$) | 59.4 |
| Sodium sulfate ($Na_2SO_4$) | 9.2 |
| Boric acid ($H_3BO_3$) | 29.7 |

The amount of concentrated nitric acid necessary to adjust the pH of an aqueous solution thereof to proper range is as follows:

| | |
|---|---|
| 70% nitric acid ($HNO_3$) sp. gr. 1.42 | 25.5 cc./l. or 36.2 g./l. |
| Maximum pH range | 0.1 to 1.0. |
| Preferred pH range | 0.2 to 0.6. |
| Optimum pH | 0.3. |

We have indicated that optimum results are obtained with the above formulation. However, a satisfactory finish can be obtained by use of, for example, sodium bichromate or other water soluble salt for the chromic acid, ammonium sulfate or other water soluble salt of sulfuric acid for the sodium sulfate, and sodium metaborate or other water soluble salt for the boric acid.

It should be noted with respect to the above preferred formulation that a satisfactory finish can be obtained through a wide range of dilutions, so long as the ratio between the chromic acid and the sodium sulfate remains in the same proportion to wit, about 6.5:1. The chromic acid range can vary between 20 and 160 g./l. of solution. The boric acid concentration can vary between 10 and 40 g./l. of solution, the higher the concentration the more chemically polished and clearer being the resultant film.

The nitric acid can be varied from about 10 to 40 ccs. per liter of solution, the actual amount being dependent upon the operating pH desired. Additions should be made when necessary to keep within color or analytical control ranges used.

Of course, it is readily understood that different concentration ranges would be applicable to the use of water soluble salts of chromic acid or boric acid, or to the use of sulfuric acid or other water soluble salts thereof for the sodium sulfate. These different concentration ranges can be calculated using the ranges noted heretofore for the preferred formulation. In other words, the calculations should be such that the same amount of hexavalent chromium, sulfate, and borate, respectively, are realized in the mixture being formed.

Examples of the use of the indicated substitutes for the compositions making up the preferred formulations are hereinafter set forth.

Example II

| | | |
|---|---|---|
| Sodium bichromate | g./l. | 89.0 |
| Anhydrous sodium sulfate | g./l. | 9.2 |
| Boric acid | g./l. | 29.7 |
| Nitric acid | ml./l. | 30.0 |

In the above example, a tempearture of 90° F., an immersion time of 20 seconds and a pH of 0.3 were utilized. A bright colorless film resulted upon treatment by this formulation.

Example III

| | | |
|---|---|---|
| Chromic acid | g./l. | 59.4 |
| Sulfuric acid | ml./l. | 3.5 |
| Boric acid | g./l. | 29.7 |
| Nitric acid | ml./l. | 25.0 |

In the above example, the temperature of 95° F., immersion time of 10 seconds and a pH of 0.5 were utilized to give a bright colorless film.

Example IV

| | | |
|---|---|---|
| Chromic acid | g./l. | 59.4 |
| Anhydrous sodium sulfate | g./l. | 9.2 |
| Sodium metaborate | g./l. | 30.0 |
| Nitric acid | ml./l. | 30.0 |

The same temperature, immersion time and pH were utilized as in Example III.

The use of the borate and nitric acid is necessary in all the mixtures to produce a polished bright, colorless film by a single treatment or immersion. The former functions as a buffering agent and the latter imparts and aids in the maintenance of the required acidity. In addition, the nitric acid increases the operating life of the dip.

For carrying out the dip treatment the solution may be maintained at a temperature range of from about 60° to 120° F. The period of immersion may extend from 1 to 120 seconds, depending on concentration, pH and temperature of the solution. A preferable temperature range for the solution is between 85° and 95° F. and a preferable immersion period is between 5 and 20 seconds.

Parts must be thoroughly rinsed after processing to obtain optimum results. For example, a water rinse may be employed and its primary function is to remove any excess dipping solution which might cause streaking. The coated part may then be dried by air blast, centrifuge, hot water rinse, or other practical means.

So called bleach dips prior to the water rinse are not imperative and need not be used particularly where the article is processed in an automatic or conveyorized operation. In such a case the solution remaining on the surface of the coated article is sufficient to invoke a self-bleaching action provided the transfer time between the chemical dip and the subsequent water rinse is fifteen seconds or more.

In some cases, however, an actual bleach dip might be advisable in order to obtain a clear finish. Such a second dip can be used, for example, to compensate for poor drainage, over depletion of dip solution, or poor surface character of the zinc or cadmium. This bleach may be a 0.1 solution of phosphoric acid or a dilute solution of caustic soda. Since all bleach dips remove some portion of the protective coating, some reduction in corrosion resistance of the coating will be noted. The bleach is operated at room temperature and an immersion time of five to thirty seconds is preferred, or until discoloration is removed.

It is preferred to immerse the castings of zinc or the articles coated with zinc or cadmium in a dip bath. However, the treatment may, in some cases, be carried out by other means, e.g., by spraying the aqueous acidic solution upon the surfaces to be treated.

The zinc and cadmium surfaces are initially introduced into the aqueous bath until a desired bright surface is formed. Slight agitation of the bath or the part being dipped, or both, is advantageous. Articles treated with the solution in the manner above set forth exhibit an enhanced appearance and resistance to salt spray.

A significant feature of the invention, as indicated above, is the maintenance of a critical acidity. The initial pH is imparted by the nitric acid and, if chromic acid is used, the chromic compound incorporated in the dry powder mixture. As previously pointed out, the function of the nitric acid is to adjust the pH to a satisfactory working point which could not be attained by reliance on chromic acid of the powder mixture alone.

As a result of continued utilization of the dipping bath, its pH tends to rise and it may then be necessary to add additional nitric acid to maintain the critical pH value and thus to avoid discoloration of the parts being treated. In the event that the dipping solution itself needs some replenishment, the aforementioned maintenance of pH may possibly be accomplished solely by the addition of more chromic acid-containing powder mixture. In this latter situation, the chromic acid present in the added powder mixture will be sufficient to adequately lower the pH without the necessity of having to add further nitric acid. It can be appreciated, therefore, that the necessity for adding the additional nitric acid is governed by the amount and make-up of dry powder mixture being added and the amount of deviation of pH of solution from its operating value.

It has been found that solutions having a pH of from about 0.2 to 0.6 are preferable but a pH range of from 0.0 to 1.0 is operable. A typical pH value has been found to be 0.3.

In the appended claims, the expression "zinc and cadmium articles" is intended to cover castings and coatings of zinc and cadmium and alloys thereof, as well as mixtures in which the zinc and cadmium are present in substantial amount.

The novel principles of this invention are broader than the specific embodiments recited above and rather than unduly extend this disclosure by attempting to list all the numerous modifications which have been conceived and reduced to practice during the course of this development, these novel features are defined in the following claims.

We claim:

1. A composition for use in aqueous solution to impart a protective, bright coating to zinc and cadmium articles comprising at least one chromic compound selected from the group consisting of chromic acid and water soluble salts thereof, at least one sulfate compound selected from the group consisting of sulfuric acid and water soluble salts thereof, at least one boric compound selected from the group consisting of boric acid and water soluble salts thereof and nitric acid and in which said chromic compound is in amount equivalent to from about 20 to 160 grams of chromic acid per liter of solution, said sulfate compound is in amount equivalent to an amount, in grams of sodium sulfate per liter of solution, of sodium sulfate having a ratio by weight of 1:6.5 to said equivalent chromic acid range, said boric compound is in amount equivalent to from about 10 to 40 grams of boric acid per liter of solution and the nitric acid is in amount to give a pH of not greater than about 1.0, when the said composition is put in aqueous solution.

2. A composition for use in aqueous solution to impart a protective, bright coating to zinc and cadmium articles comprising chromic acid, sodium sulfate, boric acid, and nitric acid and in which said chromic acid in amount from about 20 to 160 g./l., the boric acid in amount from about 10 to 40 g./l., the sodium sulfate in ratio by weight to the chromic acid in amount of about 1:6.5, the foregoing weight ranges being per liter of aqueous solution, and the nitric acid in amount to give a pH not greater than about 1.0, when the said composition is put in aqueous solution, 3. A composition according to claim 2 containing said chromic acid in amount of about 59.4 g./l., the boric acid in amount of about 29.7 g./l., the sodium sulfate in amount of about 9.2 g./l., the foregoing weights being per liter of aqueous solution, and the nitric acid in amount to give a pH of 0.3, when the said composition is put in aqueous solution.

4. An aqueous acidic solution to impart a protective, bright coating to zinc and cadmium articles comprising water, at least one chromic compound selected from the group consisting of chromic acid and water soluble salts thereof, at least one sulfate compound selected from the group consisting of sulfuric acid and water soluble salts thereof, at least one boric compound selected from the group consisting of boric acid and water soluble salts thereof and nitric acid and in which the chromic compound is in amount equivalent to from about 20 to 160 grams of chromic acid per liter of solution, said sulfate compound is in amount equivalent to an amount, in grams of sodium sulfate per liter of solution, of sodium sulfate having a ratio by weight of 1:6.5 to said equivalent chromic acid range, said boric compound is in amount equivalent to from about 10 to 40 grams of boric acid per liter of solution, and the nitric acid is in amount to give a pH of not greater than about 1.0.

5. An aqueous acidic solution to impart a protective, bright coating to zinc and cadmium articles comprising water, chromic acid, sodium sulfate, boric acid, and nitric acid and in which the chromic acid is present in amount of about 20 to 160 g./l., the boric acid in amount of about 10 to 40 g./l., the sodium sulfate in ratio by weight to the chromic acid in amount of about 1:6.5, and the nitric acid in amount to give the aqueous solution a pH not greater than about 1.0.

6. An aqueous acidic solution according to claim 5 wherein the chromic acid is present in amount of 59.4 g./l., the boric acid in amount of 29.7 g./l., the sodium sulfate in amount of 9.2 g./l. and the nitric acid in amount to give the aqueous solution a pH of 0.3.

7. The method of treating zinc and cadmium articles to produce thereon a protective, bright coating which comprises subjecting the same to an aqueous acidic solution comprising water, at least one chromic compound selected from the group consisting of chromic acid and water soluble salts thereof, at least one sulfate compound selected from the group consisting of sulfuric acid and water soluble salts thereof, at least one boric compound selected from the group consisting of boric acid and water soluble salts thereof and nitric acid and in which the chromic compound is in amount equivalent to from about 20 to 160 grams of chromic acid per liter of solution, said sulfate compound is in amount equivalent to an amount, in grams of sodium sulfate per liter of solution, of sodium sulfate having a ratio by weight of 1:6.5 to said equivalent chromic acid range, said boric compound is in amount equal to from about 10 to 40 grams of boric acid per liter of solution and the nitric acid is in amount to give a pH of not greater than about 1.0.

8. The method of treating zinc and cadium articles to produce thereon a protective, bright coating which comprises subjecting the same to an aqueous, acidic solution comprising water, chromic acid, sodium sulfate, boric acid, and nitric acid and in which, the chromic acid is present in amount from about 20 to 160 g./l., the boric acid is present in amount from about 10 to 40 g./l., the sodium sulfate is present in ratio by weight to the chromic acid of about 1:6.5, and the nitric acid in amount to give the aqueous solution a pH not greater than about 1.0.

9. A method according to claim 8 wherein the chromic acid is present in amount of 59.4 g./l., the boric acid is present in amount of 29.7 g./l., the sodium sulfate in amount of 9.2 g./l., and the nitric acid in amount to give the aqueous solution a pH of 0.3.

10. A method according to claim 7 wherein the treatment is conducted with the solution at a temperature of about 60° to 120° F., the immersion time is from 1 to 120 seconds, and the immersion is followed by a water rinse.

11. A method according to claim 8 wherein the treatment is conducted with the solution at a temperature of about 60° to 120° F., the immersion time is from 1 to 120 seconds and the immersion is followed by a water rinse.

12. The method of treating zinc and cadmium articles to produce thereon a protective, bright coating comprising immersing the same in an aqueous acidic solution comprising water, chromic acid, sodium sulfate, boric acid, and nitric acid, immersing in a chemical bleaching solution, rinsing in cold water, rinsing in hot water and drying in an air blast and in which the chromic acid is present in amount of about 20 to 160 g./l., the boric acid in amount of about 10 to 40 g./l., the sodium sulfate in ratio by weight to the chromic acid in amount of about 1:6.5 and the nitric acid in amount to give the aqueous solution a pH not greater than about 1.0.

13. A method according to claim 12 wherein the chemical bleaching solution is a 0.1% solution of phosphoric acid at room temperature and wherein the bleach immersion time is from about 5 to 30 seconds.

14. A method according to claim 12 wherein the chemical bleaching solution is a 0.1% solution of phosphoric acid at room temperature and wherein the bleach immersion time is from about 5 to 30 seconds.

15. A method according to claim 12 wherein chromic acid is present in amount of 59.4 g./l., the sodium sulfate in amount of 9.2 g./l., the boric acid in amount of 29.7 g./l. and the nitric acid in amount to give the aqueous solution a pH of 0.3.

References Cited in the file of this patent

UNITED STATES PATENTS

| | | |
|---|---|---|
| 2,080,348 | Truitt | May 11, 1937 |
| 2,330,170 | Manuel | Sept. 21, 1943 |
| 2,434,021 | Thompson | Jan. 6, 1948 |
| 2,453,429 | Gorman | Nov. 9, 1948 |
| 2,559,878 | Johnson | July 10, 1951 |
| 2,572,228 | Whyzmuzis | Oct. 23, 1951 |
| 2,613,165 | Fisher | Oct. 7, 1952 |

OTHER REFERENCES

Blum et al.: Principals of Electroplating and Electroforming, third edition, published 1949 by McGraw-Hill, page 366.